US010761959B2

(12) United States Patent
Milirud et al.

(10) Patent No.: US 10,761,959 B2
(45) Date of Patent: Sep. 1, 2020

(54) SYNCHRONIZED TEMPORAL AND FREQUENCY-BASED VISUALIZATIONS OF OPERATIONAL DATA

(71) Applicant: Microsoft Technology Licensing, LLC, Redmond, WA (US)

(72) Inventors: Michael Milirud, Redmond, WA (US); Zaki Maksyutov, Carnation, WA (US); Bin Du, Redmond, WA (US); Yi Jun Liu, Renton, WA (US); Iuliia Safarova, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 259 days.

(21) Appl. No.: 15/712,951

(22) Filed: Sep. 22, 2017

(65) Prior Publication Data
US 2019/0095311 A1   Mar. 28, 2019

(51) Int. Cl.
| | |
|---|---|
| *G06F 3/00* | (2006.01) |
| *G06F 11/34* | (2006.01) |
| *G06F 17/18* | (2006.01) |
| *G06F 16/332* | (2019.01) |
| *G06F 11/30* | (2006.01) |
| *G06F 11/32* | (2006.01) |
| *G05B 23/02* | (2006.01) |

(52) U.S. Cl.
CPC ...... *G06F 11/3466* (2013.01); *G06F 11/3006* (2013.01); *G06F 11/323* (2013.01);
(Continued)

(58) Field of Classification Search
CPC ............. G06F 16/3323; G06F 11/2006; G06F 11/323; G06F 11/2409; G06F 11/3452;
(Continued)

(56) References Cited

U.S. PATENT DOCUMENTS

| | | |
|---|---|---|
| 6,070,190 A | 5/2000 | Reps et al. |
| 6,141,699 A | 10/2000 | Luzzi et al. |

(Continued)

OTHER PUBLICATIONS

Chapter 2, "Monitoring and Analyzing Traffic", Retrieved From <<https://www.cisco.com/c/en/us/td/docs/net_mgmt/network_analysis_module_software/6-2/user/guide/NAM_user_book/monitr_analysis.pdf>>, Retrieved on: Jun. 2, 2017, 42 Pages.

(Continued)

*Primary Examiner* — Kyle R Stork
(74) *Attorney, Agent, or Firm* — Buckley, Maschoff & Talwalkar LLC

(57) ABSTRACT

A system includes presentation of a first visualization of a first set of the plurality of samples on the display device, each sample of the first set associated with a time within a first time period, and the first visualization plotting a time against a metric value for each sample of the first set, presentation of a first histogram of the first set on the display device, the first histogram indicating, for each of a first plurality of metric categorizations, a number of samples of the first set associated with the metric categorization. Changing of the first period to a second time period results in cross-synchronization of the visualizations with a second set of data samples associated with the second time period. A first sample of the first set and associated with a first metric categorization may be identified as associated with a first stored event trace, where the first visualization presents a first indicator in association with the first metric categorization and which indicates the first stored event trace.

20 Claims, 15 Drawing Sheets

(52) U.S. Cl.
CPC ...... *G06F 11/3409* (2013.01); *G06F 11/3452* (2013.01); *G06F 16/3323* (2019.01); *G06F 17/18* (2013.01); *G05B 23/0216* (2013.01); *G06F 2201/865* (2013.01)

(58) Field of Classification Search
CPC .. G06F 17/18; G06F 11/3466; G06F 11/3409; G06F 11/3006; G06F 2201/865; G05B 23/0216
See application file for complete search history.

(56) References Cited

U.S. PATENT DOCUMENTS

| | | | |
|---|---|---|---|
| 6,975,963 B2 * | 12/2005 | Hamilton | G06F 11/3409 702/180 |
| 7,088,255 B2 | 8/2006 | Ridolfo et al. | |
| 8,145,518 B2 | 3/2012 | Cao et al. | |
| 8,887,077 B2 * | 11/2014 | Milirud | H04L 43/045 715/202 |
| 9,251,035 B1 | 2/2016 | Vazac et al. | |
| 9,289,191 B2 | 3/2016 | Clingman et al. | |
| 2014/0229346 A1 * | 8/2014 | Caldwell | G06Q 40/12 705/30 |
| 2015/0113460 A1 * | 4/2015 | High | G06F 9/451 715/771 |
| 2017/0123627 A1 | 5/2017 | Cristoforo | |

OTHER PUBLICATIONS

Anderson, Bill et al., "Network Performance Monitor solution in Log Analytics", Retrieved From <<https://docs.microsoft.com/en-us/azure/log-analytics/log-analytics-network-performance-monitor>>, Apr. 12, 2017, 22 Pages.

* cited by examiner

900

| Examples | Timestamp: 2017-07-22T20:28:10.7090738  Machine: eo00155da9665testingapp |
| --- | --- |
| | Process ID: 7268  Activity ID: e4dea634-2e49-91ec-c49838rf33fdhh |

Examples

>99th Percentile
3769.45 ms  07:22:44 AM, 2017-07-24

95th – 99th Percentile
No examples found in this range

75th – 99th Percentile
1238.32 ms  07:38:17 PM, 2017-07-23
1176.52 ms  12:41:42 AM, 2017-07-24
1155.67 ms  01:12:43 PM, 2017-07-23
1155.08 ms  01:58:18 PM, 2017-07-23

<75th Percentile
1117.38 ms  08:48:16 PM, 2017-07-23
1072.50 ms  03:32:41 PM, 2017-07-23
419.44 ms  07:23:03 PM, 2017-07-24
411.55 ms  12:43:00 AM, 2017-07-24

Name

*FIG. 9*

SYNCHRONIZED TEMPORAL AND FREQUENCY-BASED VISUALIZATIONS OF OPERATIONAL DATA

BACKGROUND

System monitoring tools are used to identify and diagnose performance issues during the development and operation of computer systems and software applications. These tools may acquire operational data from one or more computer systems via log files, telemetry, etc. and present the operational data to a user for analysis. Modem monitoring tools employ user interfaces designed for monitoring large-scale operational data generated by, for example, cloud-based system deployments.

A user interface of a system monitoring tool may display values of performance metrics (e.g., operation duration, processor usage, etc.) which may be indicative of system performance. These values may be displayed with respect to time or within histograms which indicate the frequency with which particular metric values occur. Conventional monitoring tools do not provide efficient mechanisms for concurrently viewing and manipulating time and frequency-based visualizations of metric values. Moreover, conventional tools fail to efficiently correlate particular metric value instances with specific system events, and to identify such correlations within a visualization. These shortcomings may hinder the identification and diagnosis of computing system performance issues.

BRIEF DESCRIPTION OF THE DRAWINGS

FIG. 9 is an outward view of a user interface presented by a display device according to some embodiments.

DETAILED DESCRIPTION

The following description is provided to enable any person in the art to make and use the described embodiments. Various modifications, however, will remain readily apparent to those in the art.

Generally, some embodiments provide efficient presentation of metric values related to computing system operation, in both temporal and frequency domains, in response to user selection of a subset of data samples. Embodiments provide a technical solution to a technical problem by operating in conjunction with user interactions and by presenting technical information of a computing system to facilitate the addressing of technical problems within the computing system.

Figure 1A:
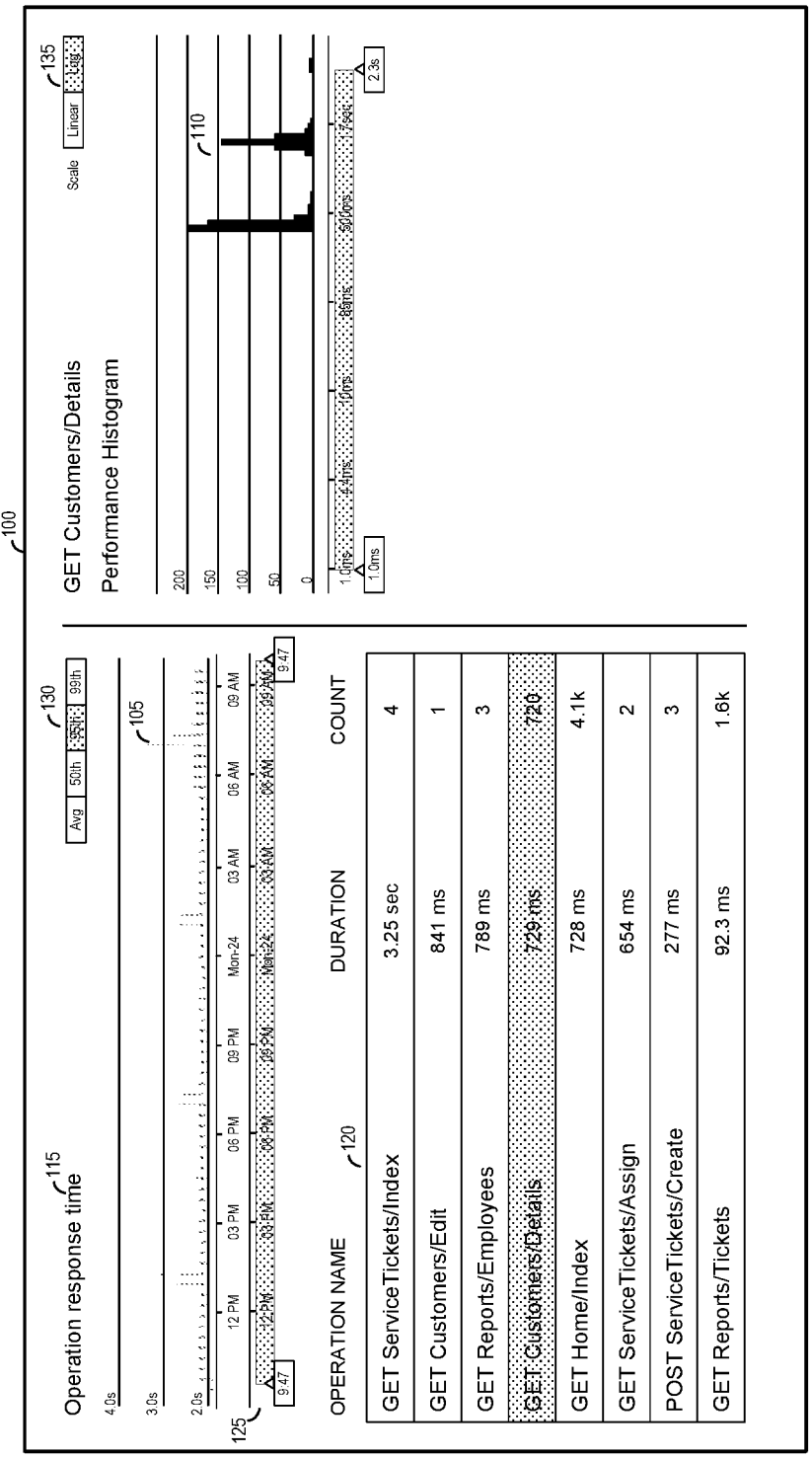
FIG. 1A is an outward view of a user interface presented by a display device according to some embodiments.

FIG. 1A is an outward view of user interface 100 according to some embodiments. User interface 100 presents visualizations 105 and 110 of a set of data samples. The data samples may represent operational data associated with a monitored computer system. Several non-exhaustive architectures and processes for acquiring the data samples will be described below.

Each data sample is associated with a value of metric 115 (i.e., operation response time, in the present example) corresponding to an event (e.g., a particular computing operation) and a time at which the event occurred. Visualization 105 is a temporal visualization of the metric values and plots the metric value against the occurrence time for each data sample. Visualization 110 is a frequency histogram illustrating, for each of several categorizations of the metric (e.g., individual ranges of response times), the number of data samples in the set of data samples which are associated with the metric categorization.

User interface 100 includes operation table 120. Operation table 120 presents, for each listed computing operation, a count of corresponding data samples and the aggregated value of metric 115, as computed based on the corresponding data samples. The operation GET Customers/Details is selected, and visualizations 105 and 110 therefore reflect a set of data samples associated with this selected operation.

The data samples reflected in visualizations 105 and 110 are also limited to those data samples associated with an occurrence time falling within a time period specified by time window indicator 125. According to some embodiments, selection of an operation within operation table 120 results in selection of data samples falling within a predetermined default time window, which spans twenty-four hours in the example of FIG. 1A. As will be described below, a user may manipulate user interface 100 to change the time window and to thereby change the set of data samples represented within visualization 105 and visualization 110.

Percentile controls 130 may be used to select the particular set of data samples which is reflected in visualizations 105 and 110 and which is used to calculate the aggregate metric values in table 120. As shown, the $95^{th}$ percentile option of control 130 is selected. Accordingly, the durations and counts associated with each operation of table 120 are calculated based on data samples which are associated with metric values (i.e., operation response times) within the highest 5% of metric values of the data samples associated with the specified twenty-four hour period. Similarly, due to the selection of the GET Customers/Details operation of table 120, visualizations 105 and 110 also represent data samples which are associated with operation response times within the highest 5% of the data samples associated with the specified twenty-four hour period.

As mentioned above, visualization 110 comprises a histogram illustrating a count of data samples for each of several ranges of metric values. The X-axis represents the number of samples for a given range of metric values. The ranges of metric values (in this case ranges of operation durations) are represented by the widths along the Y-axis of the vertical bars of visualization 110. As will be described with respect to FIG. 5, embodiments may illustrate data sample counts associated with any type of categorizations of the current metric.

The counts of visualization 110 are based on the same data samples that are reflected in visualization 105. In the illustrated example of FIG. 1A, both visualization 105 and visualization 110 depict data samples associated with the GET Customers/Details operation, an occurrence time between 9:47 am and 9:47 am, and an operation response time within the top 5% of all data samples associated with the GET Customers/Details operation and the same time period. Accordingly, visualizations 105 and 110 may be characterized as synchronized with one another.

Figure 1B:
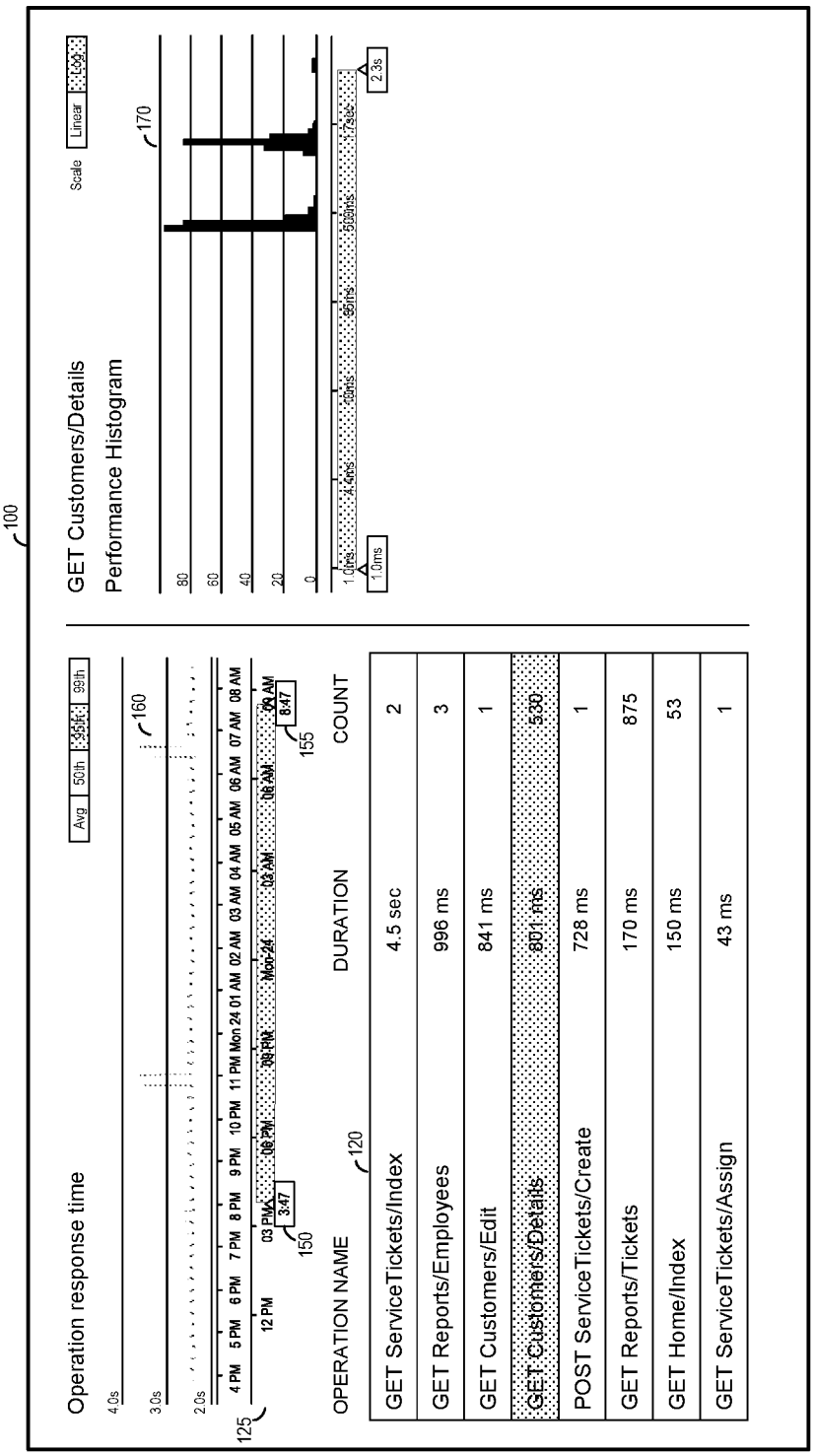
FIG. 1B is an outward view of a user interface presented by a display device according to some embodiments.

FIG. 1B illustrates an aspect of this synchronization according to some embodiments. As shown, a user has manipulated interface 100 to narrow the time period indicated by time window indicator 125. The narrowed time period spans a seventeen hour time period between 3:47 pm and 8:47 am. The time period may be narrowed in some embodiments via user selection and dragging of start indicator 150 and/or stop indicator 155. In some embodiments, a user narrows the time period of visualization 105 by selecting a region of visualization 105 using a click and drag metaphor. Embodiments may employ any suitable implementation for changing the time period.

According to some embodiments, and in response to the changed the time window, the temporal and frequency visualizations of user interface 100 are automatically and efficiently synchronized to reflect a new set of data samples. With respect to the present example, visualizations 160 and 170 are automatically generated to represent a subset of the data samples represented by visualizations 105 and 110. More particularly, visualizations 160 and 170 represent data samples associated with the GET Customers/Details operation, an occurrence time between 3:47 pm and 8:47 am, and an operation response time within the top 5% of all data samples associated with the GET Customers/Details operation during the same time period. Additional details for implementing this functionality will be provided below.

Operations table 120 has also changed from that shown in FIG. 1A to reflect the new set of data samples. In particular, the counts, aggregated durations, and resulting order of the listed operations are determined based on data samples associated with the GET Customers/Details operation, an occurrence time between 3:47 pm and 8:47 am, and an operation response time within the top 5% of all data samples associated with the GET Customers/Details operation during the same time period.

Figure 1C:
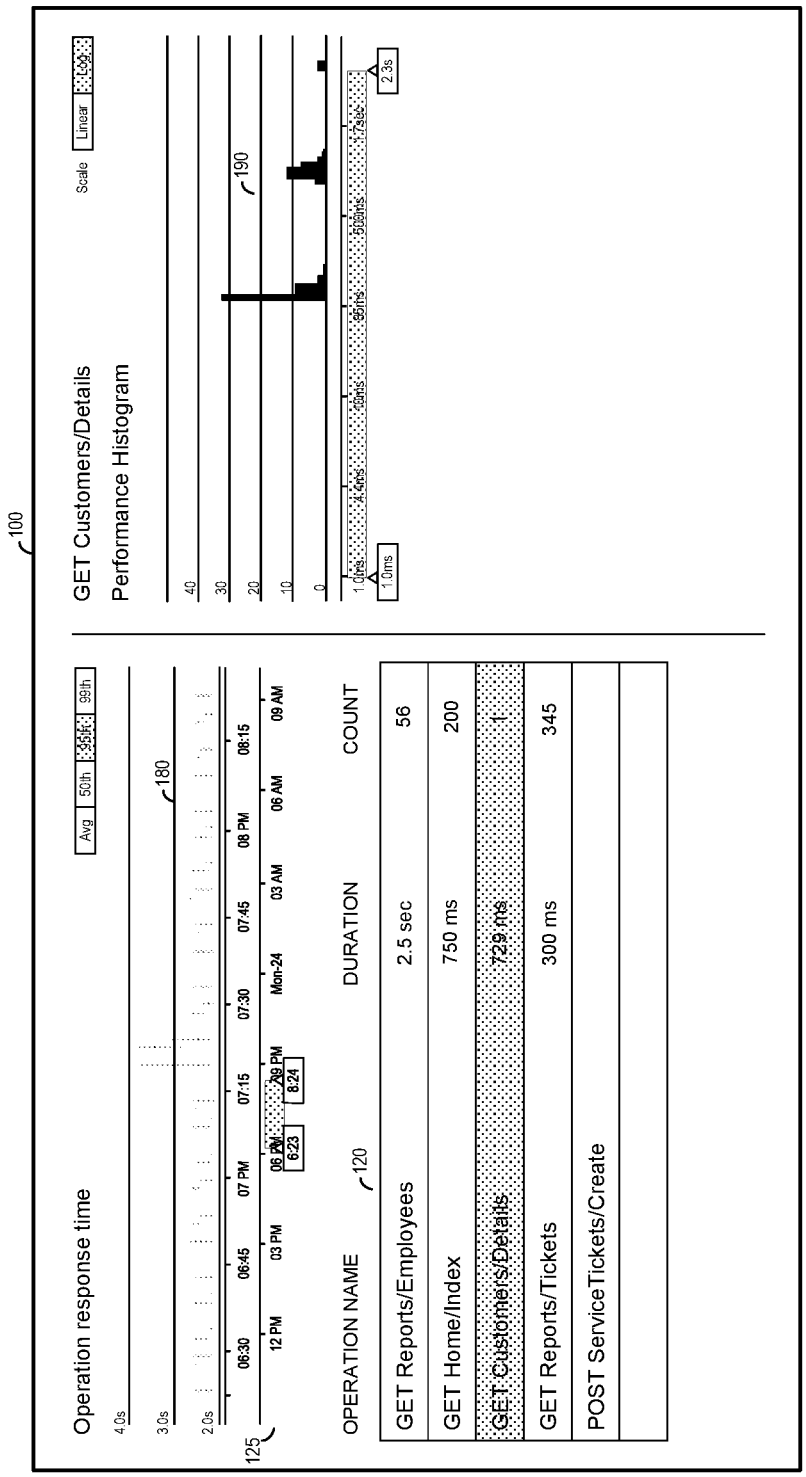
FIG. 1C is an outward view of a user interface presented by a display device according to some embodiments.

FIG. 1C illustrates user interface 100 after receipt of another user interaction to change the data sample time period. In particular, time window indicator 125 indicates a time period between 6:23 pm and 8:24 pm. In response to changing of the time period, new visualizations 180 and 190 are automatically presented to represent data samples associated with the GET Customers/Details operation, an occurrence time between 6:23 pm and 8:24 pm, and an operation response time within the top 5% of all data samples associated with the GET Customers/Details operation during the same time period. Also as described above, the information of operations table 120 has been recalculated and updated to reflect the new set of data samples.

Figure 2:
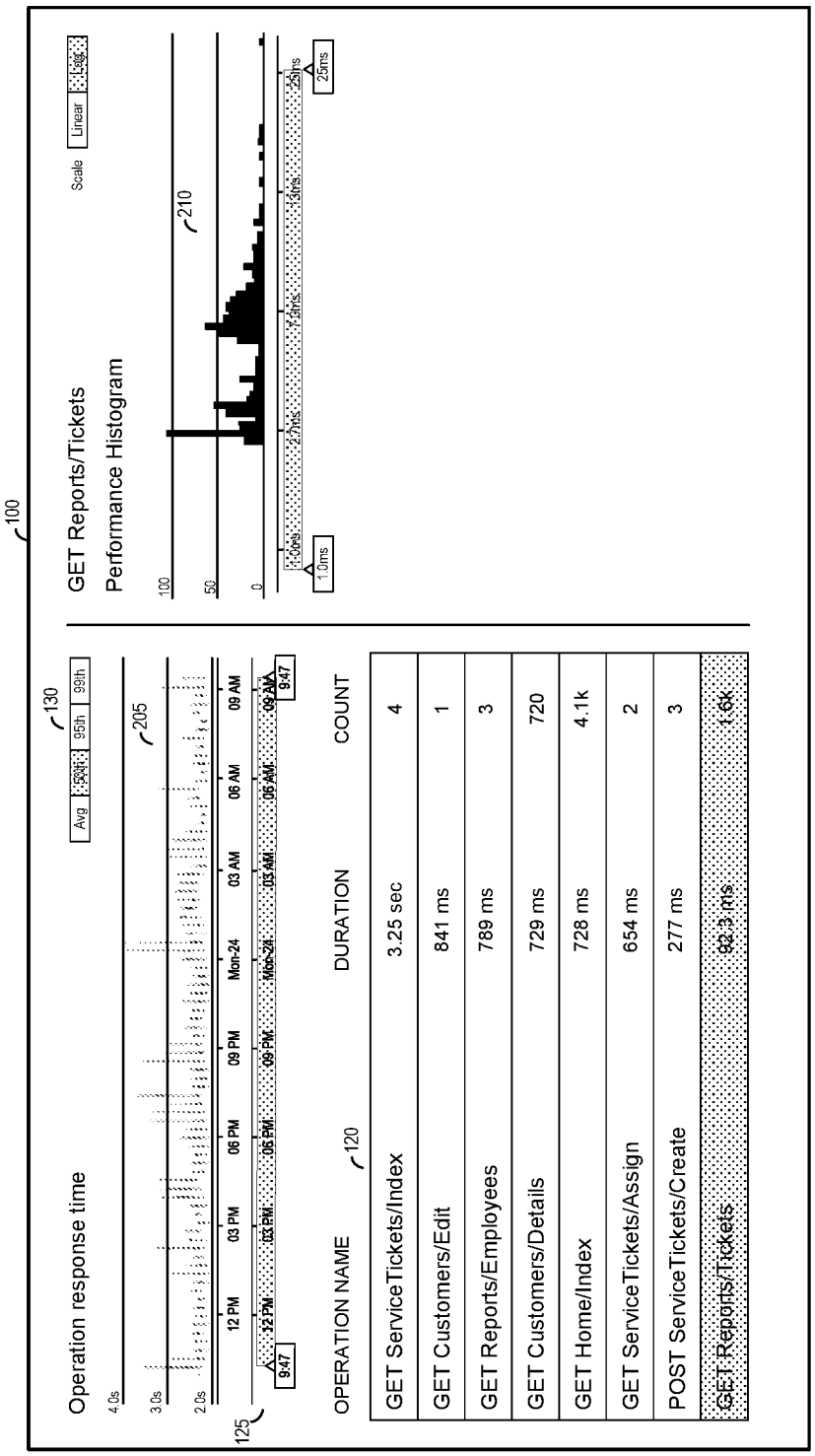
FIG. 2 is an outward view of a user interface presented by a display device according to some embodiments.

FIG. 2 shows user interface 100 after user selection of another operation listed in operations table 120. More particularly, in response to user selection of the operation GET Reports/Tickets, user interface 100 is automatically updated to present visualizations 205 and 210. According to the illustrated embodiment, the time period specified by time window control 125 has returned to the default twenty-four hour period. The user has also selected the 50% control of percentile controls 130. Consequently, visualizations 205 and 210 represent data samples associated with the GET Reports/Tickets operation, an occurrence time between 9:47 pm and 9:47 pm, and an operation response time within the top 50% of all data samples associated with the same operation and time period. Subsequent manipulation of time window control 125 to change the relevant time period results in similar changes to visualizations 205 and 210 as described above.

User interface 100 may comprise one of several user interfaces of a performance monitoring tool which provides functionality in addition to that described herein. User interface 100 may be presented by a display system of any suitable client device, such as but not limited to a desktop computer, a laptop computer, a tablet computer, a smartphone, and a virtual-reality headset. According to some embodiments, user interface 100 is a user interface of a Web application executing within a Web browser executed by a client system.

Figure 3:
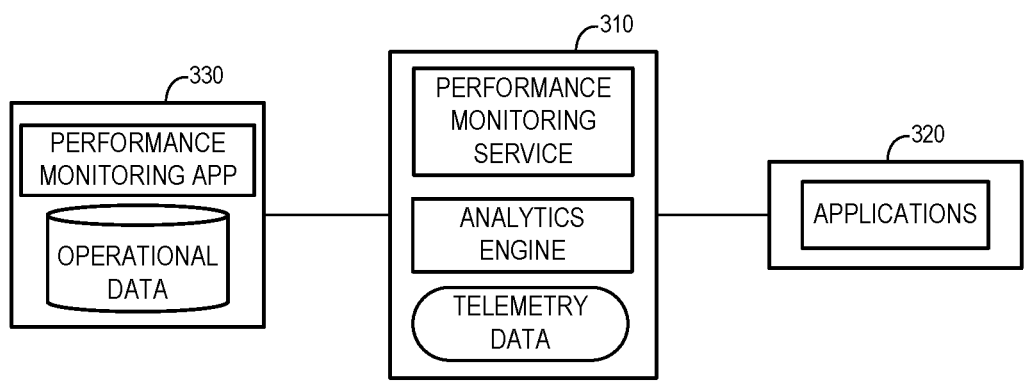
FIG. 3 is a block diagram of a system architecture according to some embodiments.

System 300 of FIG. 3 is a basic block diagram of an architecture according to some embodiments. System 300 includes performance monitoring backend 310, application platform 320 and client system 330. Generally, performance monitoring backend 310 collects telemetry data from application platform 320, processes the telemetry data, and provides processed operational data to client system 330 for display thereby.

Performance monitoring backend 310 may comprise one or more network servers executing a performance monitoring service and an analytics engine as is known in the art. Backend 310 may also comprise a database for storage of telemetry data which is received from monitored systems and, in some embodiments, processed to facilitate system responsiveness to received analytical queries.

Application platform 320 may comprise one or more computer servers executing one or more applications. As is known in the art, execution of the applications may generate event logs and other data indicative of the performance of the hardware of platform 320 and of the software of the executing applications. Software agents executing on platform 320 may transmit this data to backend 310. According to some embodiments, the applications themselves are additionally or alternatively augmented with software code which executes to transmit this data to backend 310.

Client system 330 may comprise any suitable computing device capable of executing a performance monitoring application to present a user interface as described herein. As mentioned above, the performance monitoring application of client system 330 may comprise a Web application executed within a Web browser.

Client system 330 also comprises operational data according to some embodiments. The operational data may include the data samples described above, and may consist of two or more distinct caches. As will be described below, the storage of particular operational data in client system 330 may facilitate the efficient synchronization of visualizations detailed herein.

Figure 4:
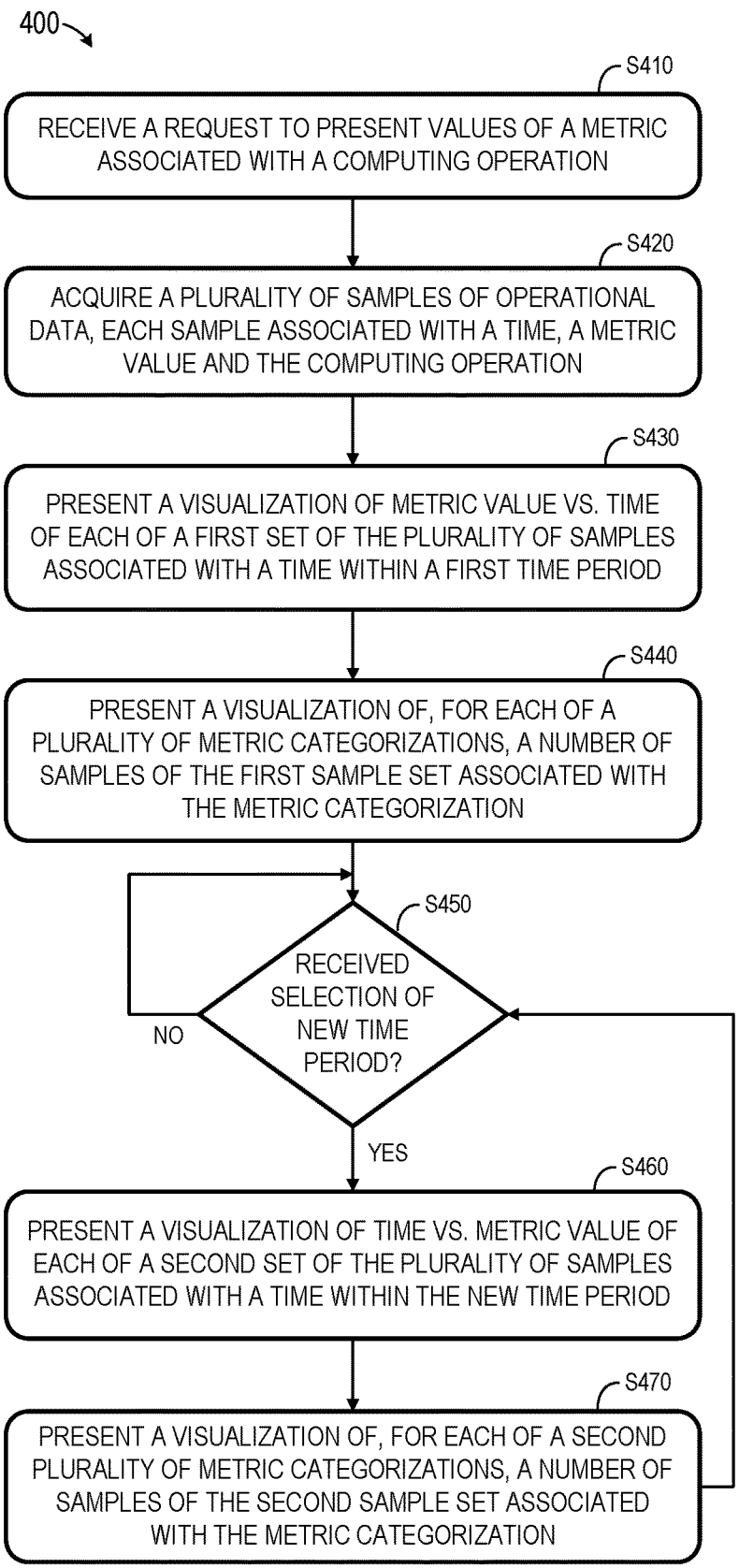
FIG. 4 is a flow diagram of a process according to some embodiments.

FIG. 4 comprises a flow diagram of process 400 to provide synchronization of visualizations according to some embodiments. In some embodiments, various processing units (e.g., one or more processors, processing cores, processor threads, etc.) of a client system execute software program code to cause a client system to perform process 400. Process 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S410, a request is received to present values of a metric associated with a computing operation. The request may comprise a user instruction, input through a user interface of a performance monitoring application, to access a performance monitoring page associated with a particular operational metric. With respect to user interface 100 of FIG. 1A, a user may operate a monitoring application to access a user interface for monitoring the duration required to execute HyperText Transfer Protocol (HTTP) operations.

In response to the request, a plurality of samples are acquired at S420. Each sample is associated with a time (e.g., an occurrence time), a value of a metric (e.g., response time) and the computing operation. According to some embodiments, the application performance monitoring application issues analytical queries to a performance monitoring service of a backend system at S420 to retrieve the operational data samples. The queries may comprise queries to acquire data samples associated with times falling within a default time window (e.g., the prior twenty-four hours), for each of one or more computing operations. For example, S420 may comprise acquiring operational data samples for all monitored computing operations (e.g., all HTTP methods executed by the monitored computing platform).

Additionally, S420 may comprise issuing queries to acquire various subsets of the operational data samples. For example, the queries may comprise queries to acquire all data samples associated with the default time window and with a top 5% of metric values of all samples associated with the default time window, for each of one or more computing operations. Similar queries may be issued for the top 1%, top 50% and any other desired subset of data samples. All samples of operational data acquired at S420 may be stored on the client system for fast access and generation of temporal and frequency-based visualizations in response to user input as described with respect to FIGS. 1A, 1B, 1C and 2.

More generally, according to some embodiments, the data samples needed to support the functionality described with respect to FIGS. 1A, 1B, 1C and 2 are retrieved and loaded into the client system prior to user interaction with interface 100. Consequently, and based on the locally-stored result sets, the client system may efficiently generate and present synchronized time and frequency-domain visualizations in response to user selection of various time periods.

In this regard, visualizations are presented at S430 and S440. The visualization presented at S430 is a visualization of metric value (e.g., X-axis) plotted against time (e.g., Y-axis) for each of a first set of the acquired samples. Each sample of the first set of samples is associated with a time within a first time period. For example, visualization 105 of FIG. 1A visualizes data samples associated with an operation duration, a GET Customers/Details operation, and an occurrence time within the time period specified by time window control 125. The visualized data samples are also those associated with a top 5% of occurrence times of all data samples associated with the GET Customers/Details operation, and an occurrence time within the specified time period. As mentioned above, this set of data samples may be visualized efficiently according to some embodiments because the queries for this data were previously executed and the result sets stored locally.

The visualization presented at S440 is a visualization, for each of several metric categorizations, of a number of samples of the first sample set which are associated with the metric categorization. Visualization 110 is an example of a visualization presented at S440 according to some embodiments. Each metric categorization is a particular range of response times, and each vertical bar of visualization 110 represents a number of samples which are associated with a response time within the particular range of response times represented by the vertical bar.

Visualization 110 presents data samples which are associated with an operation duration, a GET Customers/Details operation, and an occurrence time within the time period specified by time window control 125, and which are associated with a top 5% of occurrence times of all data samples associated with the GET Customers/Details operation, and an occurrence time within the specified time period. Again, since queries for the data of visualization 110 were previously executed, visualization 110 may be generated and presented quickly.

Process 400 pauses at S450 until user selection of a new time period is received. For example, a user may manipulate time window control 125 as described above to select a new time period. If so, flow proceeds to S460.

At S460, a visualization of a second set of the acquired samples is presented. The second set may be a subset of the first set of samples which was visualized at S430 and S440. For example, visualization 160 of FIG. 1B represents a subset of the samples represented by visualization 105 of FIG. 1A. In particular, visualization 160 represents data samples associated with an operation duration, a GET Customers/Details operation, an occurrence time between 3:47 pm and 8:47 am, and with a top 5% of occurrence times of all data samples associated with the GET Customers/Details operation and an occurrence time within the newly-specified time period. Similarly, visualization 170 is presented at S470 based on the same second set of data samples.

Since the queries required for visualizations 160 and 170 were issued and the corresponding result sets acquired at S420, these visualizations may be generated and presented at S460 and S470 without issuing new time-consuming queries to a backend system. Consequently, user review and analysis of the operational state of the monitored system may proceed more efficiently than with respect to prior monitoring systems.

Flow returns to S450 from S470 according to some embodiments. Accordingly, a user may select another time period (e.g., via time window control 125) and, in response to the selection, cross-synchronized temporal and frequency-domain visualizations are efficiently and rapidly presented at S460 and S470. FIG. 1C provides one example of this operation according to some embodiments.

As described with respect to FIG. 2, a user may select a next operation for which to view associated data visualizations. In some embodiments, process 400 initiates and executes to acquire the data samples associated with the next operation and present appropriate visualizations as described. However, in a case that data samples for all monitored operations have been previously acquired and stored locally as described above (e.g., upon initial access of interface 100), the time and frequency-based visualizations associated with the next operation may be efficiently presented without the need for issuing new analytical queries, as described above.

Some embodiments of the above-described interactive synchronization of sampled temporal and frequency domains of an operational metric enable quick and meaningful searching of the relevant samples. By virtue of the foregoing, some embodiments facilitate determination of how often an operation was slow and of any specific sampled modes. The interactivity and cross-synchronization capability may also facilitate triaging performance issues in production. Additionally, the interactive focus on the running percentiles may allow a user to efficiently assess the severity/priority of Quality of Service issues, by focusing on the most impactful issues.

Figure 5:
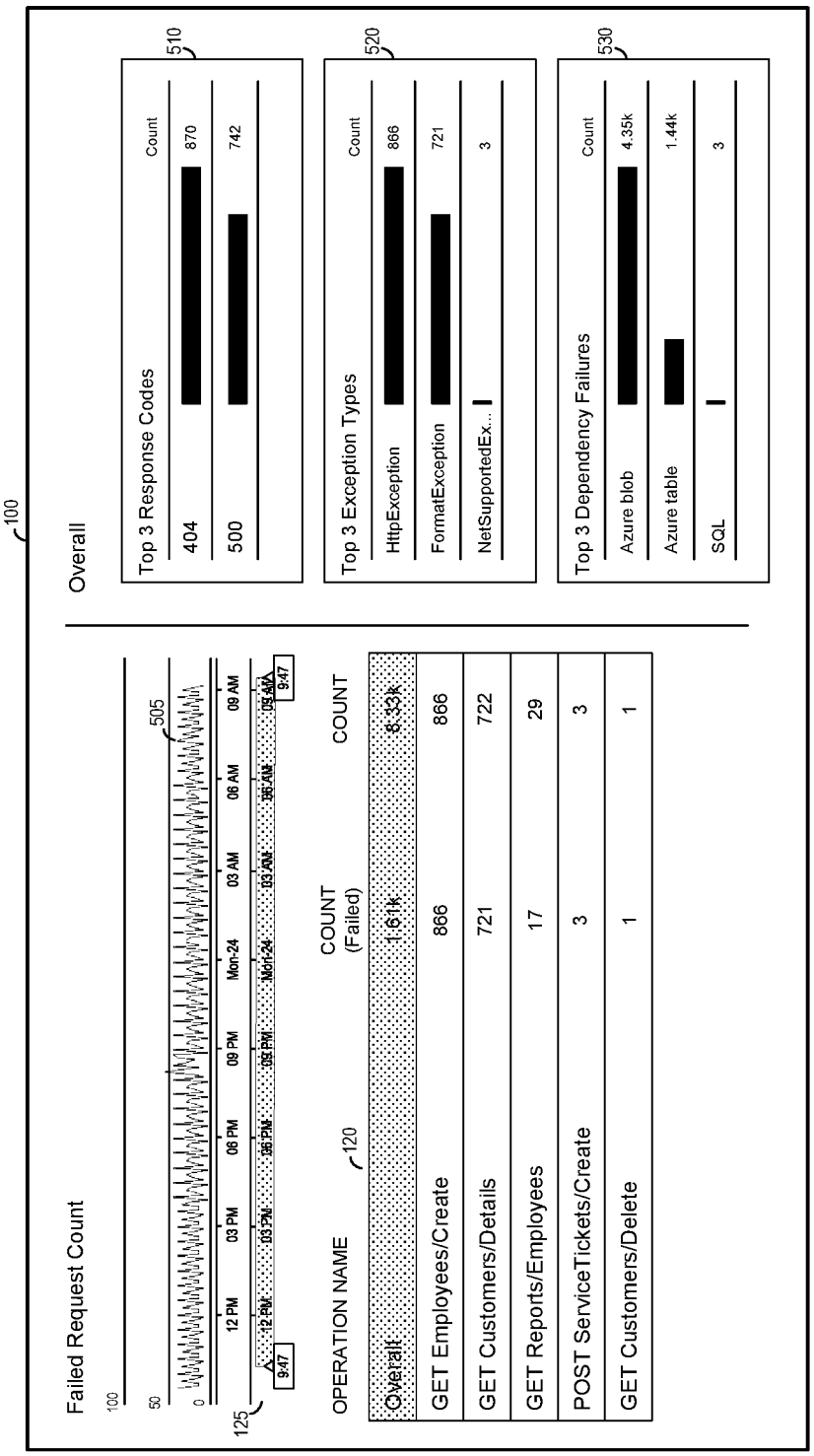
FIG. 5 is an outward view of a user interface presented by a display device according to some embodiments.

Embodiments are not limited to a response time metric. User interface 100 of FIG. 5 presents visualizations 505, 510, 520 and 530 of a set of data samples. The data samples are associated with a value of a failed request count metric and an occurrence time. Visualization 505 is a temporal visualization of the metric value plotted against the occurrence time for each data sample. Because the Overall row is selected in table 120, the data samples are not limited to a single operation as shown in the prior examples, but are associated with any one of the monitored operations.

Visualizations 510, 520 and 530 illustrate, for each of several metric categorizations, how many of the data samples are associated with the metric categorization. In the case of visualization 510, the metric categorizations comprise a different error response codes, and, in the case of visualization 520, the metric categorizations comprise exception types. Similarly, visualization 530 illustrates a number of the data samples which are associated with each of several dependency failures. Embodiments are not limited to the metric categorizations described herein.

According to some embodiments, the queries required for visualizations 505, 510, 520 and 530 are issued and the corresponding result sets acquired at S420. These visualizations may therefore be generated and presented at S460 and S470 without issuing time-consuming queries to a backend system, thereby facilitating user review and analysis of the operational state of the monitored system.

Figure 6:
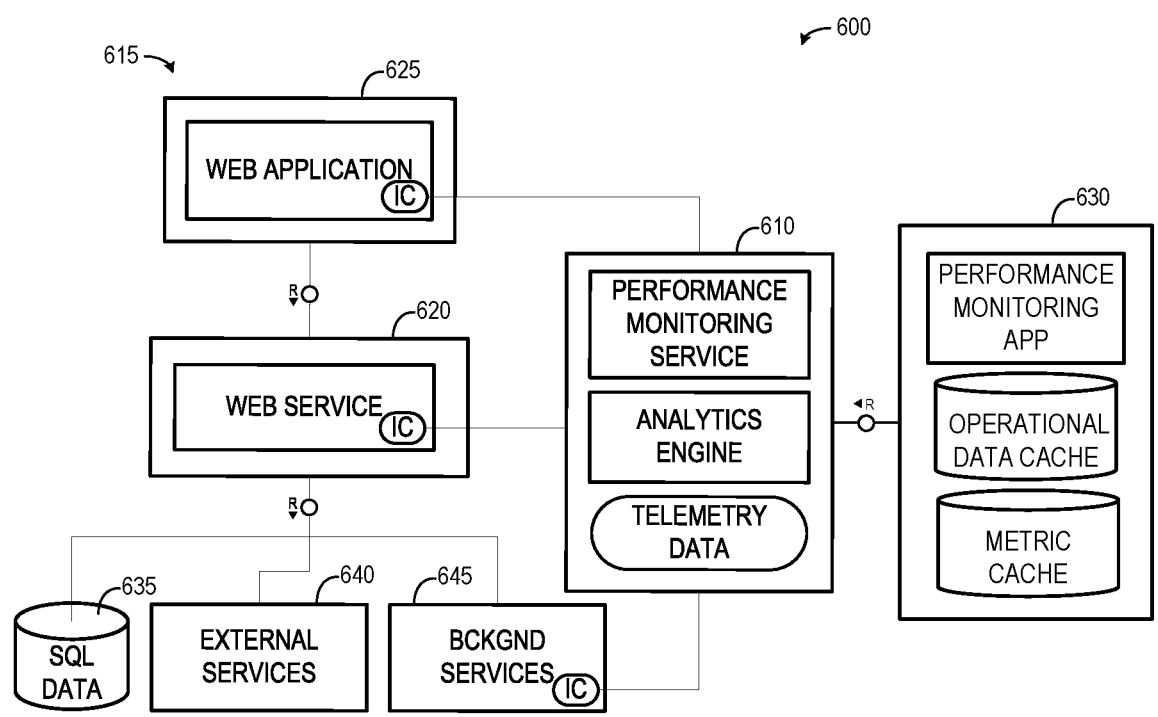
FIG. 6 is a block diagram of a system architecture according to some embodiments.

FIG. 6 is a block diagram of a system architecture 600 according to some embodiments. Performance monitoring backend system 610 is configured to monitor Web-based system 615 consisting of Web server 620, client system 625 and supporting data/services 635, 640 and 645. Web-based system 615 may be implemented using any number and type of public and/or private networks.

Generally, Web server 620 executes a Web service to respond to requests received from a Web application executed by client system 625. Responding to the requests may require Web server 620 to access remote data (e.g., SQL data 635), external services 540 or other background services 645. System 615 may comprise any other suitable architecture, and may support many separate instances of client system 625.

According to the illustrated embodiment, the code implementing Web application, Web service and background services 645 of system 615 includes instrumentation code (IC). The instrumentation code may comprise a software development kit which facilitates the transmission of in-process telemetry data to backend system 610 as is known in the art.

Client monitoring system 630 executes a performance monitoring application as described above with respect to FIG. 3. Client monitoring system 630 also includes operational data stored within two caches, referred to herein as an operational data cache and a metric cache. The two caches are intended to provide optimizations according to some embodiments.

For example, the operational data cache may store result sets acquired via queries issued by the performance monitoring application and served by the analytics engine of performance monitoring backend system 610. The result sets are stored in the operational data cache in conjunction with their associated queries. Accordingly, if a user operates the performance monitoring application to issue a query which is identical to a previously-issued query, the result set of the previously-issued query may be retrieved from the operational data cache and used in response to the subsequently-issued query. The operational data cache may therefore be utilized to reduce the number of queries transmitted to backend system 510 and improve performance of the performance monitoring application.

The metric cache may be used to store metric data acquired from backend system 510 during operation. In some embodiments, upon receiving a request for metric values from a user, the performance monitoring application first looks into the operational data cache to determine whether a result set for an identical request was previously received as described above. If such a result set is not stored, the application retrieves appropriate data from the metric cache, if available.

For example, upon access of user interface 100 of FIG. 1A, a plurality of data samples are acquired, each of which is associated with the GET Customers/Details operation and an occurrence time within a twenty-four hour period as described with respect to S420 of process 400. The data samples for the specific query are stored in the operational data cache and in the metric cache of client monitoring system 630. Assuming the time period is narrowed as shown in FIG. 1B, the corresponding data samples are not retrieved from the operational data cache because the corresponding query has changed. However, the performance monitoring application retrieves the subset from the metric cache after determining that the data samples represent metric values and that the time period has been narrowed to a subset of the original time period.

The metric cache may also be utilized in response to changes in data resolution. For example, it may be assumed that the data samples represented in FIG. 1A are acquired at five-minute intervals. According to some embodiments, if the time window is narrowed to less than a particular time resolution threshold width (e.g., one hour), the performance monitoring application is configured to acquire and visualize data samples at a higher (e.g., one minute) resolution. Accordingly, the analytics engine is queried for data samples within the narrowed time window and at the required resolution. In some embodiments, the query also requests data samples associated with a time window (e.g., two hours) before the narrowed time window and a time window (e.g., two hours) after the narrowed time window. All the resulting data samples are stored in the metric cache. Therefore, if the user subsequently moves the narrowed time window in either direction, the corresponding higher-resolution data samples may be efficiently accessed from the local metric cache.

Figure 7:
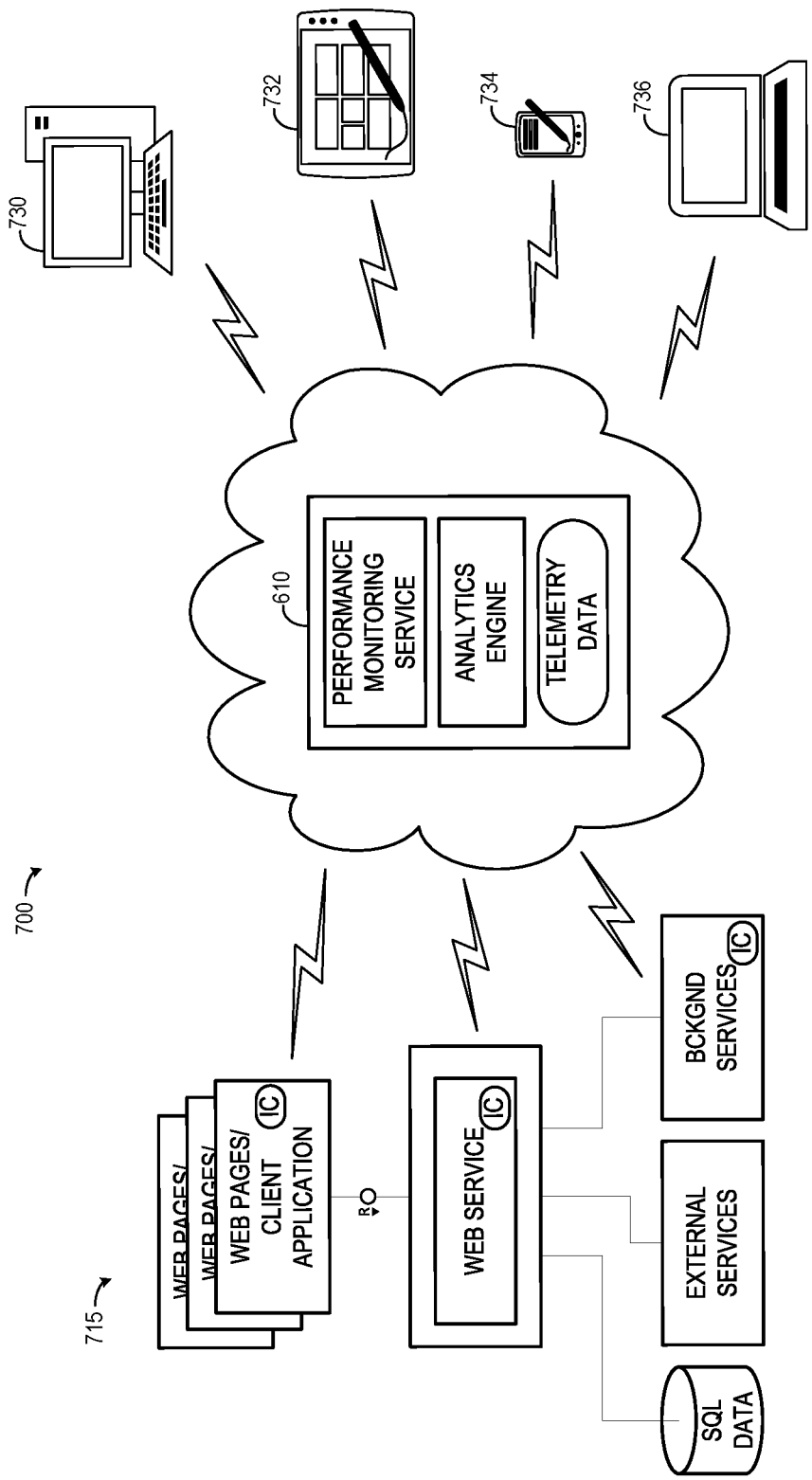
FIG. 7 is a block diagram of a system architecture according to some embodiments.

FIG. 7 is a block diagram of system 700 according to some embodiments. System 700 includes Web-based system 715 which may be configured similarly to above-described system 615. Performance monitoring backend system 710 may also be configured similarly to backend system 610 of architecture 600, but is illustrated in a cloud-based implementation. Accordingly, the elements of system 715 may provide telemetry data to system 710 via cloud-based protocols. In addition, backend monitoring system 710 may leverage cloud-based platforms, networks and infrastructure as is known in the art.

Client monitoring devices 730 through 736 may comprise implementations of client systems 330 or 630 described above. For example, each of devices 730 through 736 may store and execute a Web application received from backend system 710 as described above. Each of devices 730 through 736 may also include browser-accessible storage for storing operational data to enable efficient update and cross-synchronization of visualizations as described above.

Figure 8:
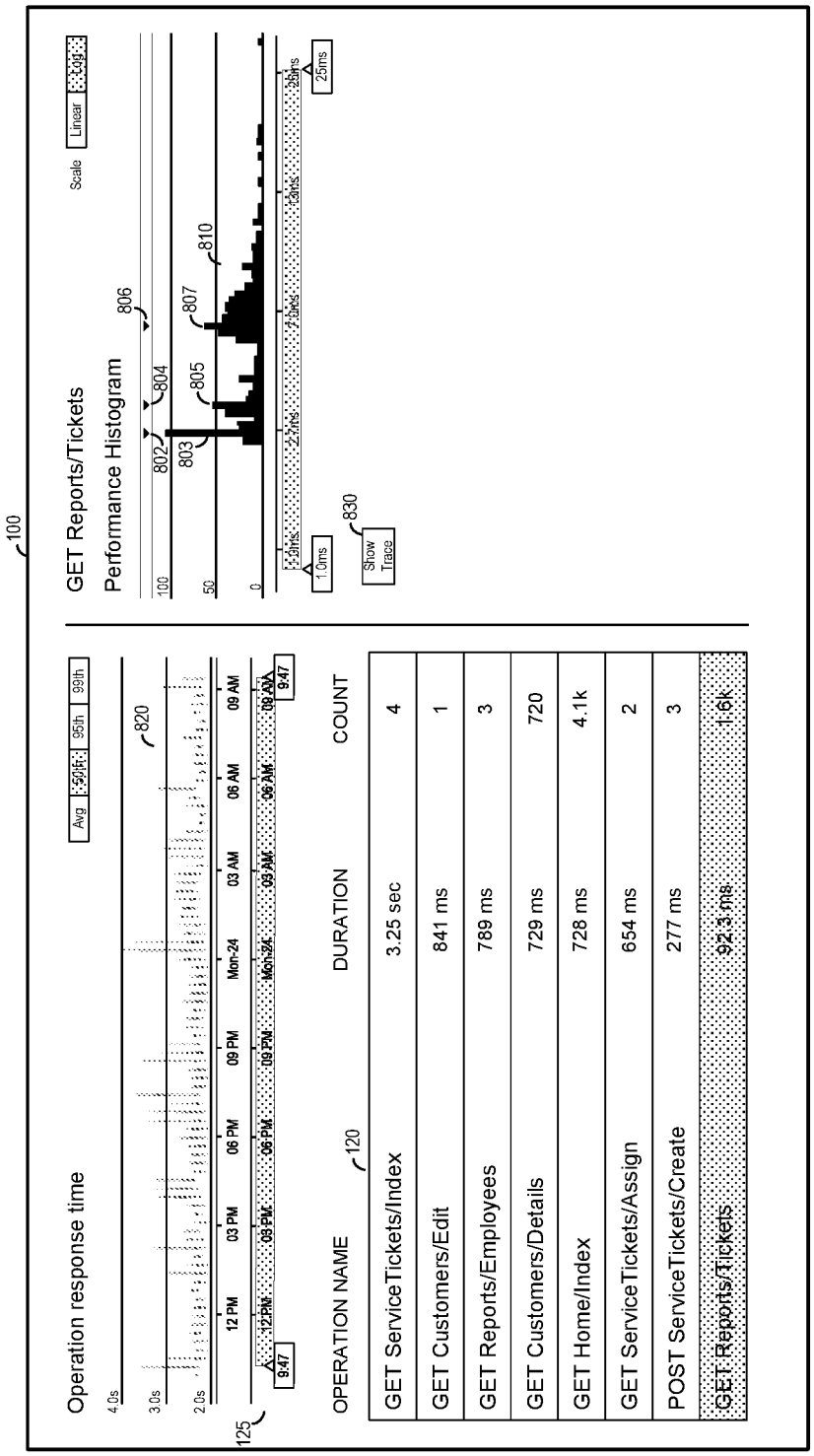
FIG. 8 is an outward view of a user interface presented by a display device according to some embodiments.

FIG. 8 illustrates user interface 100 as illustrated in FIG. 2. FIG. 8 also includes indicators 802, 804 and 806 presented in conjunction with frequency-domain visualization 810. Indicators 802, 804 and 806 are visually associated with (i.e., directly above) bars 803, 805 and 807, respectively. Bars 803, 805 and 807 are each associated with a respective range of metric values (i.e., a range of operation durations), and indicate the number of data samples in the current data set which have a metric value within their respective ranges. Indicator 802 is associated with the range of metric values associated with bar 803, indicator 804 is associated with the range of metric values associated with bar 805, and indicator 806 is associated with the range of metric values associated with bar 807. Embodiments may utilize any suitable type of graphical indicator and depict an association between the indicator and a visualization bar in any suitable manner.

According to some embodiments, each indicator 802, 804 and 806 indicates that event trace data has been identified for a data sample falling within its associated range of metric values. For example, assuming that bar 803 represents a range of values between 2.6 ms and 2.7 ms, indicator 802 indicates that event trace data has been identified for a data sample represented by visualizations 810 and 820 and associated with an operation duration between 2.6 ms and 2.7 ms. The event trace data may be considered an example of operation execution which leads to an operation duration of between 2.6 ms and 2.7 ms. Identification of event trace data associated with a data sample according to some embodiments is described below.

A user may select one of indicators 802, 804 and 806 in order to enable Show Trace control 830. Show Trace control 830 may then be selected to initiate display of the event trace corresponding to the selected indicator. FIG. 9 is an outward view of interface 900 showing an event trace which may be displayed in response to selection of Show Trace control 830. Interface 900 includes an event trace log which may be collected by an out-of-process monitoring system as is known in the art. According to some embodiments, and as will be described below, example event trace logs (e.g., representing different percentile ranges of metric values) may be identified and stored on a monitoring client for fast retrieval and display.

Figure 10:
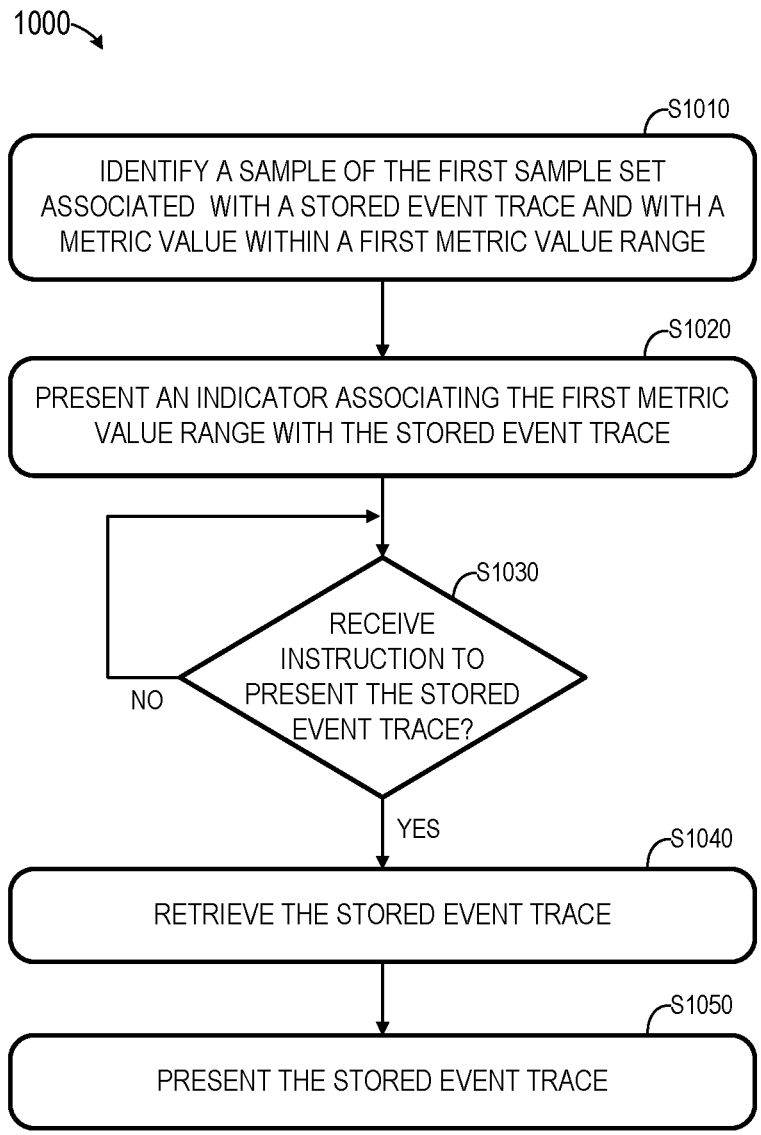
FIG. 10 is a flow diagram of a process according to some embodiments.

FIG. 10 is a diagram of process 1000 to present indicators and associated event traces according to some embodiments. Process 1000 may be executed in conjunction with presentation of a frequency-domain visualization as described herein. In this regard, process 1000 may be preceded by generation of a frequency-domain visualization as described above with respect to S440 of process 400.

Accordingly, prior to S1010, it will be assumed that a visualization has been generated which presents, for each of a plurality of metric value ranges, a number of samples of a first sample set which are associated with a metric value within the metric value range. Then, at S1010, a sample of the first sample set is identified as being associated with a stored event trace and with a first metric value range. The identification at S1010 according to some embodiments will be described below.

At S1020, an indicator is presented associating the first metric value range with the stored event trace. For example, as described above, indicator 803 associates a stored event trace with an operation duration between 2.6 ms and 2.7 ms. In a case that more than one sample was identified at S1010 as being associated with a respective stored event trace, S1020 may comprise presenting indicators for each of the identified samples, in association with the appropriate metric value range of each identified sample.

Flow cycles at S1030 until an instruction is received to present a stored event trace associated with a presented indicator. Using interface 100 of FIG. 8 as an example, flow proceeds from S1030 to S1040 upon user selection of an indicator and subsequent selection of Show Trace control 830.

The stored event trace associated with the indicator and the identified sample is retrieved at S1040. According to some embodiments, a record representing the stored event trace is stored on the monitoring client system and S1040 comprises using the information of the record to retrieve the event trace from a remote event logging system. The stored event trace is presented to the user at S1050.

Visual correlation of samples and associated event traces as described herein may provide a user with efficient exemplification-based drill-down capability. According to some embodiments, correlation of a data sample to a representative example offers an intuitive path towards diagnosis of a problematic class of issues empirically observed in a running service.

Figure 11:
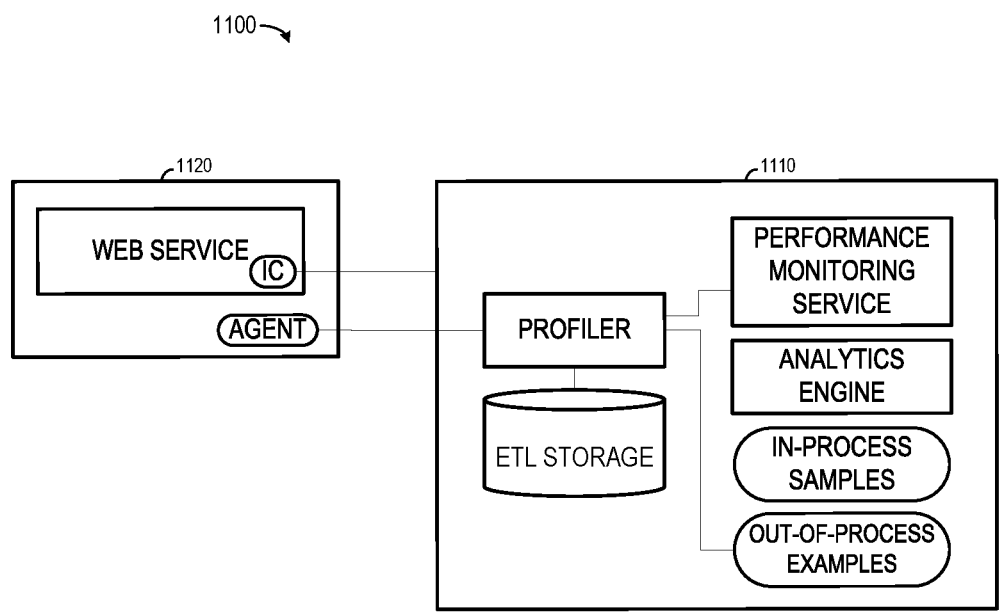
FIG. 11 is a block diagram of a system architecture according to some embodiments.

FIG. 11 is a block diagram of architecture 1100 according to some embodiments. Architecture 1100 includes backend monitoring system 1110 for collecting telemetry data as well as event traces. In this regard, backend monitoring system 1110 receives data samples from instrumentation code within a web service executing within monitored platform 1120 as described above. This data is stored and denoted as in-process samples in FIG. 11.

Backend monitoring system 1110 also includes a profiler which subscribes to events provided by an agent executing out-of-process on platform 1120 and stores corresponding event traces within an Event Trace Log (ETL) storage. Because the agent runs out-of-process, the received event traces may provide information regarding the operation of platform 1120 which is not available to the instrumentation code.

According to some embodiments, the profiler monitors the received traces and stores records of certain exemplary traces within out-of-process examples of platform 1110. The exemplary traces may include traces associated with various levels of system performance. The record for each example may include an activity identifier, which is provided by the agent executing within monitored platform 1120, and a key to a corresponding trace stored within the ETL storage. Each in-process sample provided by the instrumentation code is also associated with an activity identifier. Notably, the activity identifier of an example is identical to an activity identifier of an in-process sample if they are related to the same computing activity.

Therefore, S1010 of process 1000 may comprise identifying an in-process sample having an activity identifier identical to the activity identifier of a record of the out-ofprocess examples. Additionally, S1040 may comprise using the key of the record to access the corresponding event trace from the ETL storage.

According to some embodiments, each of the out-of-process examples is represented by two records received from the profiler, one of which includes an activity identifier and an event start time, and the other including the same activity identifier and an event end time. Because a particular in-process sample is associated with both activity identifier and a time, inclusion of the two records may assist in optimizing the search for an out-of-process example corresponding to a particular in-process sample.

Figure 12:
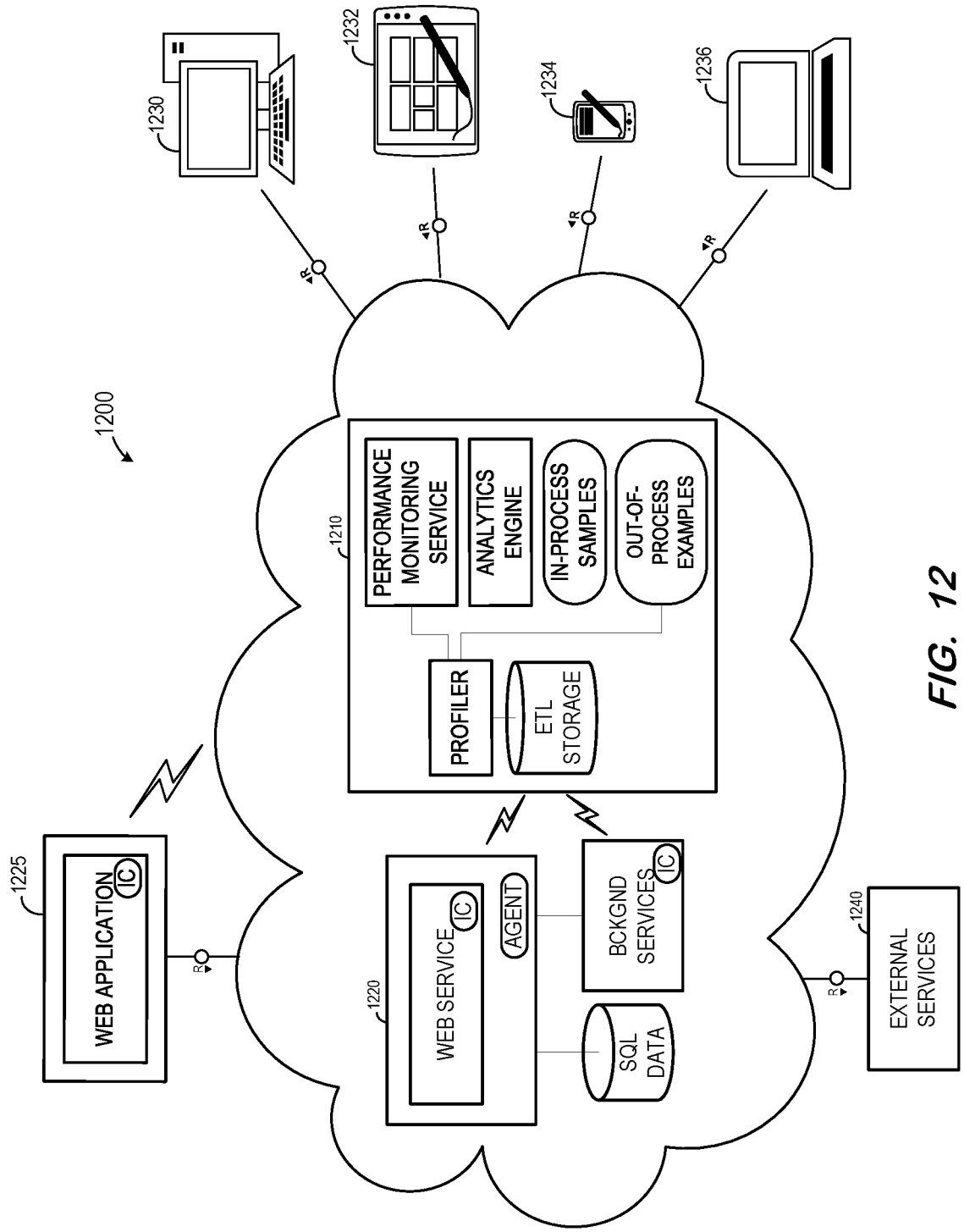
FIG. 12 is a block diagram of a system architecture according to some embodiments.

FIG. 12 is a block diagram of system architecture 1200 according to some embodiments. Architecture 1200 combines elements of several of the above-described system architectures. Performance monitoring backend system 1210 and monitored platform 1220 are implemented in the public cloud, while monitored client system 1225, external services 1240 and monitoring client systems 1230 through 1236 communicate therewith. Embodiments may be implemented by any number or type of computing system architectures.

Figure 13:
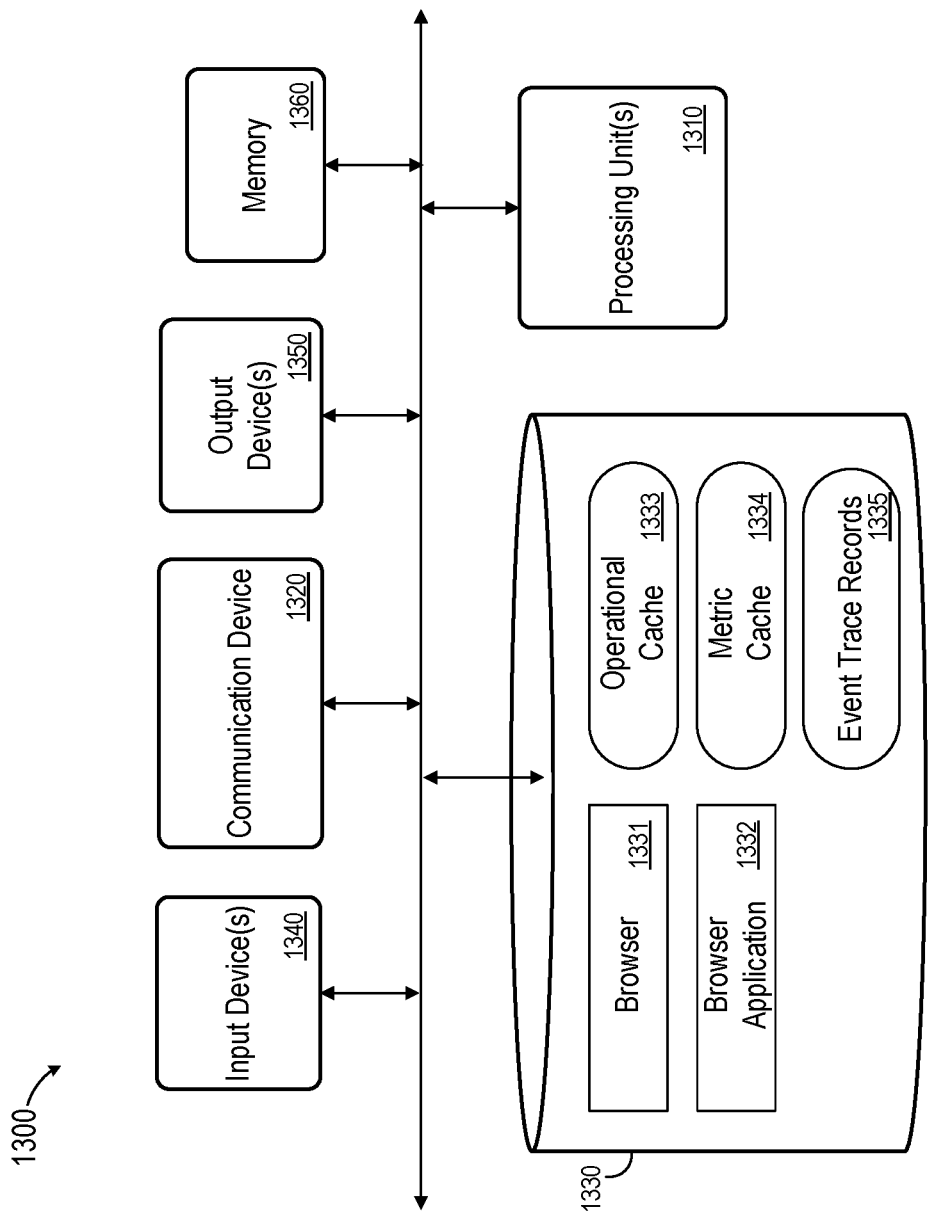
FIG. 13 is a block diagram of an apparatus according to some embodiments.

FIG. 13 is a block diagram of client monitoring system 1300 according to some embodiments. System 1300 may comprise a general-purpose computing apparatus and may execute program code to perform any of the functions described herein. System 1300 may include other unshown elements according to some embodiments.

System 1300 includes processing unit(s) 1310 operatively coupled to communication device 1320, persistent data storage device 1330, one or more input devices 1340, one or more output devices 1350 and volatile memory 1360. Communication device 1320 may facilitate communication with external devices, such as an external network in communication with the Web. Input device(s) 1340 may comprise, for example, a keyboard, a keypad, a mouse or other pointing device, a microphone, a touch screen, and/or an eye-tracking device. Input device(s) 1340 may be used, for example, to manipulate user interface controls and to enter information into system 1300. Output device(s) 1350 may comprise, for example, a display (e.g., a display screen), a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM), Storage Class Memory (SCM) or any other fast-access memory.

Browser 1331 and browser application 1332 may comprise program code executed by processing unit(s) 1310 to cause system 1300 to perform any one or more of the processes described herein. For example, execution of browser 1331 may provide an execution engine in which browser application 1332 is executed to provide user interfaces and visualizations as described herein. In this regard, operational cache 1333, metric cache 1334 and event trace records 1335 may store data as described herein and may be persisted in data storage device 1330 and/or loaded into memory 1360 during operation. Data storage device 1330 may also store data and other program code for providing additional functionality and/or which are necessary for operation of apparatus 1300, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
   a display device;
   a memory device storing processor-executable process steps; and
   a processor to execute the processor-executable process steps to cause the system to:
   acquire a plurality of samples of data associated with one or more computing operations, each of the plurality of samples associated with a respective computing operation, a time and a metric value;
   generate a first visualization of a first set of the plurality of samples, each sample of the first set associated with a time within a first time period, and the first visualization of a first visualization type and indicating a time and a metric value for each sample of the first set;
   generate a second visualization of the first set of the plurality of samples, the second visualization of a second visualization type and indicating, for each of a first plurality of categorizations of the metric value, a number of samples of the first set associated with the categorization;
   present the first visualization and the second visualization on the display device;
   receive a user selection of a second time period, the second time period being a subset of the first time period; and
   in response to the user selection of the second time period:
   generate a third visualization of a second set of the plurality of samples on the display device, each sample of the second set being a sample of the first set of the plurality of samples and associated with a time within the second time period, and the third visualization of the first visualization type and indicating a time and a metric value for each sample of the second set;
   generate a fourth visualization of the second set of the plurality of samples on the display device, the fourth visualization of the second visualization type and indicating, for each of a second plurality of categorizations of the metric value, a number of samples of the second set associated with the categorization; and
   present the third visualization and the fourth visualization on the display device.

2. A system according to claim 1, the processor to further execute the processor-executable process steps to cause the system to:

receive a user selection of a third time period, the third time period being a subset of the first time period and of the second time period; and determine that the third time period is narrower than a time period resolution threshold; and in response to the determination that the third time period is narrower than a time period resolution threshold:

acquire a second plurality of samples of data associated with the one or more computing operations over a fourth time period, the third time period being a subset of the fourth time period, each of the second plurality of samples associated with a respective computing operation, a time and a metric value, and a time resolution of the second plurality of samples being greater than a time resolution of the plurality of samples;

generate a fifth visualization of a first set of the second plurality of samples, each sample of the first set of the second plurality of samples associated with a time within the third time period, and the fifth visualization of the first visualization type and indicating a time and a metric value for each sample of the third set;

generate a sixth visualization of the first set of the second plurality of samples, the sixth visualization of the second visualization type and indicating, for each of a third plurality of categorizations of the metric value, a number of samples of the first set of the second plurality of samples associated with the categorization; and present the fifth visualization and the sixth visualization on the display device.

3. A system according to claim 1, the processor to further execute the processor-executable process steps to cause the system to:

receive a user selection of a third time period, the third time period being a subset of the second time period; and in response to the user selection of the third time period:

generate a fifth visualization of a third set of the plurality of samples, each sample of the third set being a sample of the second set of the plurality of samples and associated with a time within the third time period, and the fifth visualization of the first visualization type and indicating a time and a metric value for each sample of the third set;

generate a sixth visualization of the third set of the plurality of samples, the sixth visualization of the second visualization type and indicating, for each of a third plurality of categorizations of the metric value, a number of samples of the third set associated with the categorization; and present the fifth visualization and the sixth visualization on the display device.

4. A system according to claim 1, wherein acquisition of the plurality of samples of data comprises:

issuance of queries for data associated with one or more computing operations over a default time period, for each of a plurality of percentiles of metric values.

5. A system according to claim 1, the processor to further execute the processor-executable process steps to cause the system to:

identify a first sample of the first set associated with a first stored event trace, the first sample associated with a first categorization of the metric value, wherein presentation of the first visualization comprises presentation of a first indicator in association with the first categorization of the metric value, the first indicator indicating the first stored event trace.

6. A system according to claim 5, wherein the indicator is selectable to cause presentation of the first stored event trace.

7. A system according to claim 5, wherein identification of the first sample of the first set associated with the first stored event trace comprises:

determination of a first activity identifier associated with the first sample; and identification of a stored data record associated with the first stored event trace and with the first activity identifier.

8. A computer-implemented method comprising:

acquiring a plurality of samples of data associated with one or more computing operations, each of the plurality of samples associated with a respective computing operation, a time and a metric value;

generating a first visualization of a first set of the plurality of samples, each sample of the first set associated with a time within a first time period, and the first visualization of a first visualization type and plotting a time against a metric value for each sample of the first set;

generating a first histogram of the first set of the plurality of samples, the first histogram of a second visualization type and indicating, for each of a first plurality of categorizations of the metric value, a number of samples of the first set associated with the categorization;

presenting the first visualization and the first histogram on a display device;

identifying an instruction to change the first period to a second time period, the second time period being a subset of the first time period; and in response to the instruction:

automatically generating a second visualization of a second set of the plurality of samples, each sample of the second set being a sample of the first set of the plurality of samples and associated with a time within the second time period, and the second visualization of the first visualization type and plotting a time against a metric value for each sample of the second set;

automatically generating a second histogram of the second set of the plurality of samples, the second histogram of the second visualization type and indicating, for each of a second plurality of categorizations of the metric value, a number of samples of the second set associated with a categorization; and automatically displaying the second visualization and the second histogram on the display device.

9. A method according to claim 8, further comprising:

receiving a user selection of a third time period, the third time period being a subset of the first time period and of the second time period; and determining that the third time period is narrower than a time period resolution threshold; and in response to the determination that the third time period is narrower than a time period resolution threshold:

acquiring a second plurality of samples of data associated with the one or more computing operations over a fourth time period, the third time period being a subset of the fourth time period, each of the second plurality of samples associated with a respective operation, a time and a metric value, and a time resolution of the second plurality of samples being greater than a time resolution of the plurality of samples;

automatically generating a second visualization of a first set of the second plurality of samples, each sample of the first set of the second plurality of samples associated with a time within the third time period, and the second visualization of the first visualization type and plotting a time against a metric value for each sample of the first set of the second plurality of samples;

automatically generating a second histogram of the first set of the second plurality of samples, the second histogram of the second visualization type and indicating, for each of a third plurality of categorizations of the metric value, a number of samples of the first set of the second plurality of samples associated with a categorization; and automatically displaying the second visualization and the second histogram on the display device.

10. A method according to claim 8, further comprising:
identifying an instruction to change the second period to a third time period, the third time period being a subset of the second time period; and
in response to the instruction to change the second period to a third time period:
automatically generating a second visualization of a third set of the plurality of samples, each sample of the third set being a sample of the second set of the plurality of samples and associated with a time within the third time period, and the second visualization of the first visualization type and plotting a time against a metric value for each sample of the third set;
automatically generating a second histogram of the third set of the plurality of samples, the second histogram of the second visualization type and indicating, for each of a third plurality of categorizations of the metric value, a number of samples of the third set associated with a categorization; and
automatically displaying the second visualization and the second histogram on the display device.

11. A method according to claim 8, wherein acquiring the plurality of samples of data comprises:
issuing queries for data associated with one or more computing operations over a default time period, for each of a plurality of percentiles of metric values.

12. A method according to claim 8, further comprising:
identifying a first sample of the first set associated with a first stored event trace, the first sample associated with a first categorization of the metric value,
wherein presenting the first visualization comprises presenting a first indicator in association with the first categorization of the metric value, the first indicator indicating the first stored event trace.

13. A method according to claim 12, wherein the indicator is selectable to cause presentation of the first stored event trace.

14. A method according to claim 12, wherein identifying the first sample of the first set associated with the first stored event trace comprises:
determining a first activity identifier associated with the first sample; and
identifying a stored data record associated with the first stored event trace and with the first activity identifier.

15. A non-transitory computer-readable medium storing processor-executable code, the code executable by one or more processing units to cause a computing system to:
generate a first visualization of a first set of a plurality of samples associated with a respective computing operation, each sample of the first set associated with a time within a first time period, and the first visualization of a first visualization type and indicating a time and a metric value for each sample of the first set;

generate a second visualization of the first set of the plurality of samples, the second visualization of a second visualization type and indicating, for each of a first plurality of categorizations of a metric value, a number of samples of the first set associated with the categorization;

present the first visualization and the second visualization on a display device;

receive, at the first visualization, user input indicating user selection of a second time period, the second time period being a subset of the first time period; and in response to the user selection of the second time period:
automatically generate a third visualization of a second set of the plurality of samples, each sample of the second set being a sample of the first set of the plurality of samples and associated with a time within the second time period, and the third visualization of the first visualization type and indicating a time and a metric value for each sample of the second set;

automatically generate a fourth visualization of the second set of the plurality of samples, the fourth visualization of the second visualization type and indicating, for each of a second plurality of categorizations of the metric value, a number of samples of the second set associated with the categorization; and present the first visualization and the second visualization on the display device.

16. A non-transitory computer-readable medium storing processor-executable code according to claim 15, the code executable by one or more processing units to cause a computing system to:
receive, at the second visualization, user input indicating user selection of a third time period within the second time period; and determine that the third time period is narrower than a time period resolution threshold; and in response to the determination that the third time period is narrower than a time period resolution threshold:
acquire a second plurality of samples of data associated with the computing operation over a fourth time period, the third time period being a subset of the fourth time period, each of the second plurality of samples associated with a respective operation, a time and a metric value, and a time resolution of the second plurality of samples being greater than a time resolution of the plurality of samples;

automatically generate a fifth visualization of a first set of the second plurality of samples, each sample of the first set of the second plurality of samples associated with a time within the third time period, and the fifth visualization of the first visualization type and indicating a time and a metric value for each sample of the third set;

automatically generate a sixth visualization of the first set of the second plurality of samples, the sixth visualization of the second visualization type and indicating, for each of a third plurality of categorizations of the metric value, a number of samples of the first set of the second plurality of samples associated with the categorization; and present the fifth visualization and the sixth visualization on the display device.

17. A non-transitory computer-readable medium storing processor-executable code according to claim 15, the code executable by one or more processing units to cause a computing system to:

receive, at the second visualization, user input indicating user selection of a third time period, the third time period being a subset of the second time period; and in response to the user selection of the third time period:
automatically generate a fifth visualization of a third set of the plurality of samples, each sample of the third set being a sample of the second set of the plurality of samples and associated with a time within the third time period, and the fifth visualization of the first visualization type and indicating a time and a metric value for each sample of the third set; and automatically generate a sixth visualization of the third set of the plurality of samples, the sixth visualization of the second visualization type and indicating, for each of a third plurality of categorizations of the metric value, a number of samples of the third set associated with the categorization; and present the fifth visualization and the sixth visualization on the display device.

18. A non-transitory computer-readable medium storing processor-executable code according to claim 15, the code executable by one or more processing units to cause a computing system to:

acquire the plurality of samples of data by issuing queries for data associated with one or more computing operations over a default time period, for each of a plurality of percentiles of operation metric values.

19. A non-transitory computer-readable medium storing processor-executable code according to claim 15, the code executable by one or more processing units to cause a computing system to:

identify a first sample of the first set associated with a first stored event trace, the first sample associated with a first categorization of the metric value, wherein presentation of the first visualization comprises presentation of a first indicator in association with the first categorization of the metric value, the first indicator indicating the first stored event trace.

20. A non-transitory computer-readable medium storing processor-executable code according to claim 19, wherein identification of the first sample of the first set associated with the first stored event trace comprises:

determining a first activity identifier associated with the first sample; and identifying a stored data record associated with the first stored event trace and with the first activity identifier.

\* \* \* \* \*